(No Model.)
E. THOMSON.
METHOD OF ELECTRIC WELDING.
No. 455,420. Patented July 7, 1891.
Fig. 1.
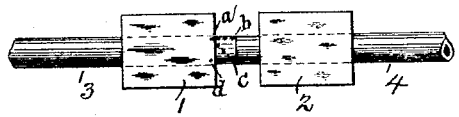
Fig. 2.
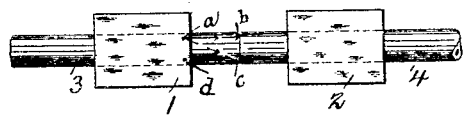
Fig. 3.
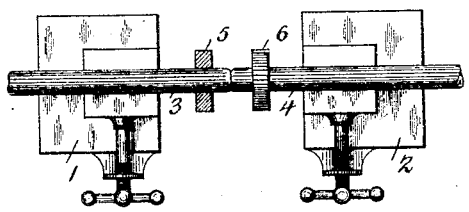
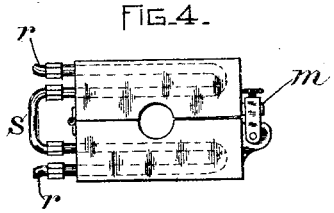
Fig. 4.
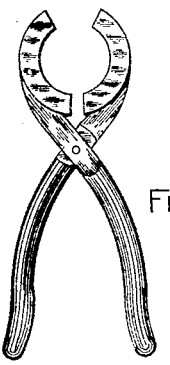
Fig. 5.
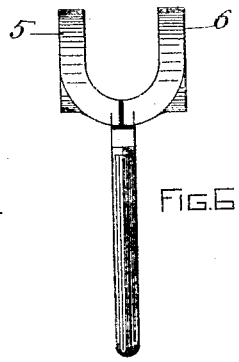
Fig. 6.
WITNESSES
Wm H Capel
T. F. Courey
INVENTOR
Elihu Thomson
By H. C. Townsend
Atty

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF MAINE.

METHOD OF ELECTRIC WELDING.

SPECIFICATION forming part of Letters Patent No. 455,420, dated July 7, 1891.

Application filed February 19, 1891. Serial No. 382,109. (No model.)

*To all whom it may concern:*

Be it known that I, ELIHU THOMSON, a citizen of the United States, and a resident of Swampscott, in the county of Essex and State of Massachusetts, have invented a certain new and useful Method of Electric Welding, of which the following is a specification.

My invention relates to an improvement in the art of electrical welding; and the object of my invention is to secure a better weld than can be obtained by the processes in use prior to my invention.

In the practice of electric welding it is found that the best welds are obtained when the current-bearing electrodes or clamps make contact with the work near the point to be heated. The reason of this is that the clamping or conducting pieces of metal which bear upon the work have a great cooling effect and the heat is made to concentrate at the point of welding and cannot be diffused through any considerable length of metal back of the point to be heated. For this reason it is desirable that the electrodes should make connection with the work as near as possible to the point where the immediate heating effect is desired, or, in other words, that they should be a short distance apart. There is, however, a disadvantage attendant upon such use of the electrodes in the fact that there is sometimes an uneven distribution of the current through the work, as will be presently explained—a difficulty which can, however, be remedied to a great extent by setting or applying the current-bearing electrodes at a considerable distance back of the point to be welded or heated. This remedy, however, is attended by the disadvantage that the concentration or localization of the heating effect at the point of the welding, which takes place when the electrodes or current-bearing contacts are near to one another, cannot be so well realized.

The object of my present invention is to avoid the difficulties and secure the advantages of both methods of procedure; to which end my invention consists, essentially, in applying the current-bearing electrodes at an extended or considerable distance back of the point of welding, so as to secure as far as may be an even distribution of the current, and applying a local or supplemental cooling by means of additional blocks or rings applied back of the welding or heating point and between the same and the points of contact of the current-bearing electrodes.

In the accompanying drawings, Figures 1 and 2 illustrate the differences in effect obtained by applying the current-bearing electrodes near to and at a considerable distance from the point of welding or heating. Fig. 3 illustrates the principle of my invention. Figs. 4, 5, and 6 are details of forms of devices that may be applied to the work immediately back of the point of welding and between the same and the point of contact of the current-bearing electrodes.

In Figs. 1 and 2 the numerals 1 2 represent the terminals of any source of electric current of large volume suitable for welding, and through which terminals the current passes to the work typified by two pieces of metal 3 4, consisting of pieces of pipe abutted against one another between said terminals. The terminals 1 2 are supposed to be the usual current-bearing electrodes or contacts which bear upon the work and supply current thereto, the current passing from one to the other and through the portion of the work between them. These current-bearing electrodes are usually in the form of suitable clamping devices, as indicated in Fig. 3.

To illustrate the advantages and disadvantages attendant upon applying the electrodes at different distances from the point of welding, let $a$ represent a point at which good electrical contact is established between the clamp and the work and $d$ a point where there is no connection, either because of the conformation of the holder or clamp or because of the existence of scale, dirt, or any unevenness in the surface of the pipe or a deficient contact or connection for any other reason. In order to distribute itself over the portion of the work to be heated, the current will take the two paths $a\ b$ and $a\ c$, and the amount that flows in each path will be inversely proportional to the resistance in the lines $a\ b$ and $a\ c$. As the pipe is practically homogeneous in character, it may be assumed that the current will be inversely proportional to the length of the lines $a\ b\ a\ c$. When the current-bearing electrodes are near to one another, this proportion between the distances $a\,b\,a\,c$ is very considerable and most of the current will take the path $a\,b$, thus producing greater heating effect on that side of the work. If, however, the electrodes 1 2 be applied at some distance back of the work, as indicated in Fig. 2, this ratio between the distances $a\,b$ $a\,c$ is less, and the current will flow in the two paths in more nearly the same ratio and a better distribution for current and heat take place. At the same time it is preferable to apply the electrodes as shown in Fig. 1, so far as concerns the localization or confining of the heating to the parts immediately involved in welding. To secure the latter advantage and at the same time obtain the benefit from the application of the current-bearing electrodes a considerable distance back of the weld, as indicated in Fig. 2, I propose to apply supplementary cooling devices between the current-bearing electrodes and the point of welding or heating—as, for instance, illustrated in Fig. 3, where 5 6 indicate supplementary copper bands or rings applied over the pieces of metal 3 4. These rings are of copper or any other good heat-conducting material and are placed so near the weld that the heat cannot be conducted to any considerable distance back of the parts to be heated and welded.

In Fig. 3 the devices are shown as continuous rings; but it will be evident that in practice it will be desirable to employ some device that can be readily applied or removed. Thus, for instance, as shown in Fig. 4, the cooling of the work back of the weld and a consequent confinement of the heating or localization of heating effect might be obtained by employing a block made in two halves hinged together, with an opening which may receive the work. The two halves of the block may have a clamp or catch (indicated at $m$) to hold the two together in close connection with the work, and, if desired, may be also provided with pipes or passages, as indicated in dotted lines, through which a cooling-fluid may be circulated to keep the block cool. The pipes or passages would be connected by flexible pipes $r\,r\,s$, as indicated, with one another and with the supply and waste pipes for the fluid.

The two halves of the ring or cooling envelope or block might be mounted in the same manner as a pair of tongs, as indicated in Figs. 5 and 6, and two rings might be mounted together, as indicated in these figures, one ring being adapted to encircle the work at one side of the weld and the other at the other side. In such case it is obvious that the two rings should be insulated from one another at their point of attachment to the handles or otherwise.

Many other ways will suggest themselves of applying a cooling effect at the point desired to prevent the heat from diffusing itself back to greater distance from the weld, while at the same time the proper distribution of the heat is obtained by applying the current-bearing electrodes at points a considerable distance back of the weld or point of heating.

It will be obvious that my invention is applicable not only to electric welding, but to any case where a section of metal is to be included in an electric circuit and heated by the passage of a current supplied through current-bearing contacts or electrodes; and I do not, therefore, confine myself to electric welding, although my invention has its principal utility in connection with welding.

What I claim as my invention is—

1. The herein-described improvement in electrically heating a section of metal by including it in an electric circuit, consisting in applying a local cooling effect to the work in the heating portion of the circuit near the points of application of the current-bearing electrodes or contacts.

2. The herein-described improvement in electric welding, consisting in surrounding the work by a good conductor of heat just back of the points of welding and between the same and the points of contact of the current-bearing electrodes, as and for the purpose described.

3. The herein-described improvement in electric welding, consisting in applying a local cooling effect just back of the weld and between the same and the points of application of the current-bearing electrodes.

4. The combination, in an electric metal-working apparatus, of current-bearing contacts or electrodes adapted to make contact with the work and supplemental rings or blocks of copper or other material that is a good conductor of heat, adapted to be applied to the work between the point of heating of the work and the points of application of said electrodes.

Signed at Lynn, in the county of Essex and State of Massachusetts, this 17th day of February, A. D. 1891.

ELIHU THOMSON.

Witnesses:
JOHN W. GIBBONEY,
BENJAMIN B. HULL.